United States Patent [19]
Jacobson

[11] 3,900,560
[45] Aug. 19, 1975

[54] SOLUTION COMPRISING A LACRYMATOR
[76] Inventor: Amnon Jacobson, Omri St. 22, Tel Aviv, Israel
[22] Filed: May 15, 1973
[21] Appl. No.: 360,509

Related U.S. Application Data
[63] Continuation-in-part of Ser. No. 259,217, June 2, 1972, abandoned.

[30] Foreign Application Priority Data
Apr. 23, 1972   Israel..................................... 39273

[52] U.S. Cl.................................. 424/45; 424/304
[51] Int. Cl.$^2$.. A61K 9/00; A61R 9/04; A01N 9/06; A01N 9/20
[58] Field of Search....................... 424/45, 304, 331

[56] References Cited
UNITED STATES PATENTS

| | | | |
|---|---|---|---|
| 2,524,590 | 10/1950 | Boe....................................... | 424/45 |
| 2,898,267 | 8/1959 | Lindner............................... | 424/331 |
| 3,050,441 | 8/1962 | Haskett............................... | 424/331 |
| 3,092,555 | 6/1963 | Horn.................................... | 424/45 |
| 3,474,176 | 10/1969 | Freeman............................. | 424/331 |
| 3,715,379 | 2/1973 | Berry et al.......................... | 424/304 |

OTHER PUBLICATIONS
Kirk–Othmer, Encyclopedia of Chem. Tech., 2nd revised Ed., Vol. 4, pp. 869, 872, 876 & 877.

*Primary Examiner*—Albert T. Meyers
*Assistant Examiner*—D. W. Robinson
*Attorney, Agent, or Firm*—Sughrue, Rothwell, Mion, Zinn and Macpeak

[57]  ABSTRACT

A homgeneous foamable lacrymator composition comprising a lacrymator selected from the group consisting of o-chlorobenzal-maleonitrile (CS) and phenylacylchloride (CN) and a surface active agent which dissolves said lacrymator to provide a nonfoamable solution, the surface active agent being selected from the group consisting of anionic and nonionic surface active agents; a solvent for the nonfoamable solution which provides a foamable solution, the solvent being selected from the group consisting of water and a solution of an organic solvent in water; and an amount of a liquified gaseous propellant sufficient to eject the foamable solution from a container and to provide by mechanical working through a nozzle a foamable composition, wherein the propellant ejects the foam to a distance of at least 4 feet, the ratio lacrymator:surface active agent being within the range of 0.05:100 – 100:100 parts (by weight), the amount of lacrymator being 0.05–3% (by weight) of the entire composition and the ratio propellant:foamable solution being within the range 1:2 – 1:50 by weight.

5 Claims, No Drawings

SOLUTION COMPRISING A LACRYMATOR

CROSS-REFERENCE TO RELATED APPLICATION

The present application is a continuation-in-part of U.S. application Ser. No. 259,217, filed June 2, 1972, now abandoned, claiming priority from Apr. 23, 1972 based on Israeli Pat. application Ser. No. 39273.

BACKGROUND OF THE INVENTION

1. Field of the Invention

The present invention relates to a foamable lacrymator composition comprising, as the active compound, a lacrymator (tear gas) selected from the group consisting of o-chlorobenzal-maleno-nitrile (CS) and phenylacylchloride (CN).

2. Description of the Prior Art

The use of lacrymators has become wide-spread in the last few years, in particular in order to disperse demonstrations but also as a means for self-defense, e.g., a lonely woman being attacked, etc. The reason for making the use of lacrymators much more common is that a non-lethal effect is quickly obtained. Moreover, although on the one hand the person whose eyes are sprayed by the lacrymator becomes defenseless, on the other hand no long-lasting harm is done to said person.

Lacrymators have so far been utilized mainly as part of a hand smoke grenade, e.g., by the police for dispersing demonstrations or as part of an aerosol composition which is sprayed from an aerosol container, e.g., for self-defense. However, the effect achieved by said means is not always satisfactory since large amounts of the active compound are lost as it is spread over a large area and thus does not reach the target, or accidentally affects the close vicinity around the target. Moreover, all said lacrymators are volatile and thus evaporate quickly.

It has thus been desirable to develop means which would ascertain that the main part of the lacrymator should reach the target, i.e., the person should be put out of action and not innocent people in his close vicinity and moreover should stay there as long as possible.

These means should not cause any harm to the persons being attacked by said material, should be cheap and easy to apply.

A principal object of the present invention therefore is to provide a composition which may be contained in a hand-size device and which is capable of forming a mass of foam with large enough volume to cover the face of the aggressor, said blanket of foam should blind the aggressor for a period of at least two seconds, which period is the normal time interval required for CS or CN to cause the aggressor to instinctively close his eyes among other physical effects and thus to incapacitate his aggressive intentions.

It is a further object of the present invention to provide said composition in a form which is capable of forming a stream of foam which can be accurately ejected to a distance of at least 4 feet, creating on the target a relatively dense, shape-retaining mass of foam which is stable for at least two minutes.

It is still another object of the present invention to provide said composition in a form which does not contain any solid particles of the lacrymator and where the foam being ejected is homogeneous and also does not comprise any solid particles.

A further object of the present invention is to provide said composition so that it has low volatility, to ensure that the lacrymator is effective on the target only and only a minimum amount of vapours are created and spread out.

SUMMARY OF THE INVENTION

It has now been found that the above objects as well as other ones are achieved by the present invention which consists in a homogeneous foamable composition consisting of 1. a non-foamable solution comprising a lacrymator selected from the group consisting of o-chlorobenzal-maleno-nitrile (CS) and phenylacylchloride (CN) and a surface active agent which dissolves said lacrymator selected from the group consisting of anionic and nonionic surface active agents;

2. a solvent for said non-foamable solution to provide a foamable solution, the solvent being selected from the group consisting of water and a solution of an organic solvent in water; and an amount of a liquified gaseous propellant sufficient to eject the foamable solution from a container and to provide by mechanical working through a nozzle a foamable composition, wherein the propellant ejects the foam to a distance of at least 4 feet, the ratio lacrymator:surface active agent being within the range of 0.05–100: 100–100 parts (by weight), the amount of lacrymator being 0.05–3% (by weight) of the entire composition and the ratio propellant:foamable solution being within the range 1:2 – 1:50 by weight.

It is readily understood that by optimizing the amount of composition that reaches the target the amount of lacrymator to be utilized may be reduced. Thus, the composition used is less harmful if applied on the face of a person, while the effect achieved is at least the same as in other utilization methods.

DESCRIPTION OF PREFERRED EMBODIMENTS

The composition of the present invention remedies several difficulties of the prior art. By proper selection of surface active agents which, together with the lacrymator, form a non-foamable solution, and also by proper seelection of a solvent which, together with the non-foamable solution, forms a foamable solution, a foamable lacrymator composition can be provided which achieves the above stated objects. Thus, the foamable lacrymator composition of the present invention enables a stream of foam to be ejected from a pressurized container to a distance of at least 4 feet and creates on the target a mass of foam which retains its dense shape for at least 2 minutes.

The composition of the present invention contains no solid particles of the lacrymator, since the presence of solid particles may be harmful to human eyes and skin and may cause permanent injury, and this should be avoided obviously. In a suitable selection of surface active agents and solvents, the presence of solid lacrymator particles can be avoided.

The requirements for the surface active agents are set forth below, but it should be noted that only anionic and nonionic surface active agents are employed in the present invention. Cationic surface active agents may degrade or destroy the lacrymator by causing nucleophilic destruction thereof.

As surface active agents there may be utilized all those anionic or nonionic surface active agents which fulfill the following requirements:

1. They are not aggressive to human eyes or skin, the respiratory system or the gastro-intestinal system to such an extent that they cause permanent injury if in contact therewith less than 10 minutes.
2. They do not degrade CS and/or CN.
3. They produce a foam volume expansion ratio of 4:1 (foam to solution) when being applied from a presurized can where the foam is created by the dynamic impingement of the solution and the propellant, through an orifice having an exit area which varies between one square millimeter and 80 square millimeters. The internal pressure in said can varies from 1 atm to 30 atm at temperatures between 0° to 120°F.
4. Causes the composition to be capable of being ejected under said pressure as a stable foam to a distance of at least 4 feet, while this foam is stable on its target for at least two minutes.
5. They have an HLB value of 12 or above. HLB is a factor attributed to a surface active agent or a mixture of surface active agents in order to define its ability to emulsify a given oil in water. An appropriate definition can be found in:

A. Beerbower and M. H. Hill; The Cohesive Energy Ratio of Emulsions.

A Fundamental Basis for the HLB Concept; McCutcheon's 1971 Annual Detergents and Emulsifiers.

6. They have the ability to dissolve CS and/or CN in water within said concentration and confinements.
7. They enable the formation of a homogeneous composition.

The following surface active agents are, inter alia, considered to be suitable for the present invention:

Ethoxylated nonylphenols; $C_9H_{19}$ $C_6H_4(OCH_2CH_2)_xOH$; for example, Ethox 266 of Ethox Chemicals, and Tergitol NPX of Union Carbide.

Ethoxylated linear alcohols; e.g., Tergitol 15-s-12 of Union Carbide.

Ethoxylated alkylolamides; e.g., Amidox $C_2$ of Stepan Chemical Company.

Ethylene oxide condensates of oleic acid; e.g., Chemester 300-OC of Chemical Products Corp.

Ethoxylated lanolin oil; e.g., Amlan AWS of American Lanolin Corp.

Polyoxyethylene-nonylphenyl ether; e.g., Nissan nonion NS 215 of Nippon Oil Fats Co., Ltd.

Polyhydric ether - esters; e.g., Polysperse 13 of Knapp Products Inc.

Sodium lauryl sulphates; e.g., Texapon Z of Henkel International GMBH.

Sodium alkyl-aryl sulfonates; e.g., Alkanol DW of duPont Company.

Carboxylated polyethoxy derivatives; e.g., Carbamone A of Hart Products Corps.

Sodium sulfate derivatives of 3,9-diethyl tridecanol-6; e.g., Tergitol 7 of Union Carbide.

Sulfated and neutralized Alfonic ethoxylates; e.g., Alfonic Ether sulfates of Continental Oil Company.

Sodium hydrocarbon sulfonates; e.g., Alkanol 189S of duPont Co.

Sodium alkylnaphthalene sulfonates; e.g., Alkanol BG of duPont Co.

Straight chain dodecylbenzene sodium sulfonate; e.g., Conoco-550 of Continental Oil Company.

Neutral tallow soda soap; e.g., Excelsior soap flakes of Laurel Products Corp.

Dioctyl ester of sodium sulfosuccinic acid; e.g., Aerosol OT 100% of American Cyanamid Company.

Sodium N-methyl-N oleoyl taurate; e.g., Igepon T-33 of G.A.F. Corp.

Polyoxyethylene (20) sorbiton monolaurate; e.g., Tween 20 of Atlas Chemical Industries.

Lauric acid diethanolamine condensate; e.g., Onyxol 336 of Onyx Chemicals.

Alphaolefil sulfonate; e.g., Bioterge AS 35 CL of Stephen Chemical Co.

The surface active agent selected alone or with the addition of an organic compound must dissolve the lacrymator to give a non-foamable solution. It should also be capable of forming a desired foamable solution with the addition of a proper solvent. Surface active agents other than those specifically exemplified above can be employed as long as they meet the above-stated requirements.

The solvent which dissolves the non-foamable solution (of the lacrymator in the surface active agent) to provide a foamable solution is, in most cases, water only. However, the solubility of CS and CN is rather restricted and therefore it is sometimes advantageous to add an organic solvent in order to increase the solubility thereof.

Said organic solvent has to be miscible with water. Moreover, it should be compatible with the other ingredients, not reduce the activity of the lacrymator, the surface active agent, and the propellant. Moreover, its reaction on the human body should not be worse than that required of the surface active agent, as indicated above. Those skilled in the art can select suitable water-miscible organic solvents meeting these criteria with a minimum amount of experimentation using well-known techniques. The preferred organic solvent is ethanol.

The composition according to the present invention may comprise also other suitable agents. In particular it may be advantageous to add an anti-freezing agent, e.g., glycerin or diethylene-glycol, so that the composition may be stored and applied also at temperatures below 32°F. without freezing.

As propellants there may be utilized any suitable compressed gas which is liquid under the conditions of temperature and pressure existing in the container, said gas having a maximum pressure of 3 atm at ambient temperature. Preferred propellants are fluorocarbons, for example, the so-called Freons, e.g., Freon 12 ($CCl_2F_2$), Freon 114 ($CClF_2$—$CClF_2$), or mixtures thereof, etc. Any conventional propellant is operable.

Sometimes, in addition to these liquified gases, the container in which the composition is filled is overpressed with a compressed gas, the pressure of which is almost independent of changes in temperatures above 0°F. Thus, the composition according to the present invention may also include an inert gas (e.g. $N_2$ air $CO_2$) in addition to the liquified propellant gas in order to achieve higher pressures (over-pressures), especially for application at low temperature (0°F.) where said fluorocarbons lose their pressure.

The composition according to the present invention may be prepared by various means. However, it is advantageously prepared by the following method:

1. Preparation of the Foamable Solution
   a. Use of liquid surface active agents.

When a liquid surface active agent is utilized, the desired amount of the lacrymator is put into a container together with the appropriate amount of the surface active agent. The mixture obtained is heated up to a temperature not exceeding 122°F (the maximum temperature at which said lacrymators are stable) and stirred until it becomes homogeneous, i.e., until all the lacrymator has been dissolved. Then the desired quantity of solvent (e.g., water) and, if desired, of other ingredients (e.g., anti-freeze agent, etc.) are added to the homogeneous mixture while stirring and heating (up to a max. of 122°F.) is continued until a homogeneous mixture is obtained.

b. Use of solid surface active agents or pastes.

In this case the required amount of surface active agent is added to a minimal amount of water with stirring and heating until the mixture becomes homogeneous.

The lacrymator is then added to the solution while stirring and heating (max. 122°F) is continued until all the lacrymator has been dissolved. The the desired quantity of solvent (e.g., water) and, if desired, of the other ingredients are added to the homogeneous mixture while stirring and heating (up to max. 122°F.) is continued until a homogeneous mixture is obtained.

2. Filling of Cans a. Standard aerosol cans.

Standard aerosol cans are filled with the foamable solution and the propellant using an ordinary aerosol filling machine. The volume of the aerosol cans may vary from 50 to 1200 cc. The valves are chosen according to the volume of the cans and the required ejection distance. The orifice of the valves should be as indicated above, between 1 sq. mm, and 80 sq. mm.

If nitrogen is used as an inert gas in addition to the propellant, it is compressed into the cans by means of a special filling machine.

b. Special Can

The propellant and the foamable solution may be filled and stored separately in different chambers of a single can. Upon actuation, propellant and foamable solution flow in separate channels each from their respective reservoirs, through a nozzle, on a screen mesh located in front of the nozzle. Foam is ejected to the required distance.

The invention will now be illustrated with reference to the following examples without being limited by them. The Trademarks or Tradenames referred to in the Examples are identified hereinabove.

EXAMPLE 1

0.3 g of CS were mixed in 9.7 g of Ethox 266. The solution was heated at 105°F until all the CS was dissolved.

Thereafter 90 g of water were added to the solution which was then stirred for a further 15 minutes at the same temperature.

70 g of this solution and 25 g of Freon 12 were introduced into an aerosol container (having a volume of 100 cc and a flow rate of 14 g/sec) at ambient temperature through a nozzle having a diameter of 2 mm.

When said composition was ejected, a volume of 2L of foam was obtained which was stable for 5 minutes.

The jet of foam reached a distance of 2 meters to its target.

EXAMPLE 2

A similar solution and a similar container as that described in Example 1 were prepared in which 23 g of the water were replaced by 23 g of glycerin. The same results were obtained.

EXAMPLE 3

0.3 g of CS were dissolved at 105°F with stirring in 90 g of a 5% aqueous solution of Aerosol OT 100%.

After all the CS had been dissolved 9.7 g of glycerin were added to the resulting solution and said solution was stirred for a further 15 minutes.

70 g of this solution and 25 g of Freon 12 were introduced into an aerosol container (having a volume of 100 cc and a flow rate of 20 g/sec) at ambient temperature through a nozzle having a diameter of 4 mm.

When said composition was ejected a volume of 2L of foam was obtained which was stable for 5 minutes.

The jet of foam reached a distance of 2 meters to its target.

EXAMPLE 4

1 g of CS was dissolved with stirring at 105°F in 16 g of Ethox 266. After all the CS had been dissolved 16 g of ethanol and 67 g of water were added and the solution obtained was stirred for another 15 minutes.

70 g of this solution and 25 g of Freon 12 were introduced into an aerosol container (having a volume of 100 cc and a flow rate of 20 g/sec) at ambient temperature through a nozzle having a diameter of 4mm.

When said composition was ejected a volume of 2.5 L of foam was obtained which was stable for 5 minutes.

The jet of foam reached a distance of 2 meters to its target.

EXAMPLE 5

In the same manner as described in Example 1, a solution and a container were prepared in which the Ethox 266 was replaced by the same amount of Tergitol NPX. The same results were obtained.

EXAMPLE 6

0.5 g of CN (Phenacylchoride) were dissolved in 9.5 g of Ethox 266. The solution was heated to 105°F with stirring. After all the CN had been dissolved 90 g of water were added and the stirring was continued for another 15 minutes.

100 g of this solution and 30 g of Freon 12 were introduced into an aerosol container having a volume of 150 cc and a flow rate of 20 g/sec at ambient temperature through a nozzle having a diameter of 4 mm.

When said composition was ejected a volume of 3L of foam was obtained which was stable for 5 minutes.

The jet of foam reached a distance of 2 meters to its target.

EXAMPLE 7

In the same manner as described in Example 6, a solution and a container were prepared in which the Ethox 266 was replaced by the same amount of Onyxol 336. The same results were obtained.

EXAMPLE 8

0.3 g CS were mixed in 14.7 g of Amidox $C_2$. The solution obtained was heated at 105°F until all the CS was dissolved. Thereafter 85 g of water were added to the solution which was then stirred for a further 15 minutes at the same temperature.

400 g of this solution and 50 g of Freon 12 were introduced into an aerosol container having a volume of 600 cc and a flow rate of 120 g/sec. at ambient temperature through a nozzle having a diameter of 7 mm. When said composition was ejected a volume of 8L of foam was obtained which was stable for 5 minutes.

The jet of foam reached a distance of 3 meters to its target.

EXAMPLE 9

In the same manner as described in Example 8, a solution and a container were prepared in which the Amidox $C_2$ was replaced by the same amount of Chemester - 300 - 0C. The same results were obtained.

EXAMPLE 10

In the same manner as described in Example 8, a solution and a container were prepared in which the Amidox $C_2$ was replaced by the same amount of Tween 20. The same results were obtained.

EXAMPLE 11

In the same manner as described in Example 1, a solution and a container were prepared in which the Ethox 266 was replaced by the same amount of Tergitol 15-S-12. The same results were obtained.

EXAMPLE 12

In the same manner as described in Example 6, a solution and a container were prepared in which the Ethox 266 was replaced by the same amount of Amlan AWS. The same results were obtained.

EXAMPLE 13

0.5 g of CS were dissolved with stirring at 105°F in 14.5 g of Nissan nonion NS-215. After all the CS had been dissolved 15 g of ethanol and 70 g of water were added and the solution obtained was heated for another 15 minutes.

800 g of this solution and 70 g of Freon 12 were introduced into an aerosol container having a volume of 1000 cc and a flow rate of 240 g/sec at ambient temperature through a nozzle having a diameter of 12 mm.

When said composition was ejected a volume of 14L of foam was obtained which was stable for 5 minutes.

The jet of foam reached a distance of 3 meters to its target.

EXAMPLE 14

In the same manner as described in Example 13, a solution and a container were prepared in which the Nissan nonion NS-215 were replaced by the same amount of Alkanol DW. The same results were obtained.

EXAMPLE 15

In the same manner as described in Example 13, a solution and a container were prepared in which the Nissan nonion NS-215 was replaced by the same amount of Tergitol 7. The same results were obtained.

EXAMPLE 16

0.3 g of CS were mixed in 197 g of Alfonic ether sulfates. The solution obtained was heated at 105°F until all the CS was dissolved. Thereafter 80 g of water were added to the solution which was then stirred for a further 15 minutes at the same temperature.

70 g of this solution, 13 g of Freon 12 and 13 g of Freon 114 were introduced into an aerosol container having a volume of 100 cc and a flow rate of 14 g/sec at ambient temperature through a nozzle having a diameter of 2 mm.

When said composition was ejected a volume of 2L of foam was obtained which was stable for 5 minutes.

The jet of foam reached a distance of 1.5 meters to its target.

EXAMPLE 17

0.3 g CS were mixed in 24.7 g of Conoco C-550. The solution obtained was heated at 105°F until all the CS was dissolved. Thereafter 75 g of water were added to the solution which was then stirred for further 15 minutes at the same temperature.

70 g of this solution and 25 g of Freon 12 were introduced into an aerosol container having a volume of 100 cc and a flow rate of 14 g/sec at ambient temperature through a nozzle having a diameter of 2 mm.

After introducing the Freon 12 compressed nitrogen was introduced into the container until the total pressure in the container reached 10 atm at 0°C.

When said composition was ejected a volume of 2L of foam was obtained which was stable for 5 minutes.

The jet of foam reached a distance of 3 meters to its target.

EXAMPLE 18

0.3 g of CS were mixed in 9.7 g Tergitol NPX. The solution obtained was heated at 105°F until all the CS was dissolved.

Thereafter 90 g of water were added to the solution which was then stirred for a further 15 minutes at the same temperature.

400 g of this solution and 50 g of Freon 12 were introduced into an aerosol container having a volume of 600 cc and a flow rate of 120 g/sec at ambient temperature, through a nozzle having a diameter of 7 mm.

After introducing the Freon 12, compressed nitrogen was introduced into the container until the total pressure in the container reached 12 atm at 0°C.

When said composition was ejected a volume of 8L of foam was obtained which was stable for 5 minutes.

The jet of foam reached a distance of 4 meters to its target.

EXAMPLE 19

In the same manner as described in Example 17, a solution and a container were prepared in which the Conoco-C-550 was replaced by the same amount of Bioterge AS-35-CL. The same results were obtained.

EXAMPLE 20

0.3 g were mixed in 29.7 g Igepon T-33. The solution obtained was heated at 105°F until all the CS was dissolved. Thereafter 70 g water were added to the solution which was then stirred for further 15 minutes at the same temperature.

70 g of this solution and 15 g of Freon 12 were introduced into an aerosol container having a volume of 100 cc and a flow rate of 20 g/sec at ambient temperature through a nozzle having a diameter of 4 mm.

When said composition was ejected a volume of 1.5 L of foam was obtained which was stable for 5 minutes.

The jet of foam reached a distance of 2 meters to its target.

EXAMPLE 21

In the same manner as described in Example 18 a solution and a container were prepared in which the Tergitol NPX was replaced by the same amount of Alkanol BG. The same results were obtained.

EXAMPLE 22

0.3 g CN were mixed in 9.7 g of Alkanol 189S. The solution obtained was heated at 105°F until all the CN was dissolved.

Thereafter 90 g of water were added to the solution which was then stirred for a further 15 minutes at the same temperature.

70 g of this solution and 10 g of Freon 12 were introduced into an aerosol container having a volume of 100 cc and a flow rate of 20 g/sec at ambient temperature through a nozzle having a diameter of 4 mm.

When said composition was ejected a volume of 1L of foam was obtained which was stable for 5 minutes.

The jet of foam reached a distance of 2 meters to its target.

EXAMPLE 23

9.7 g Texapon Z were dissolved at 105°F with stirring in 90 g of water.

After all the Texapon Z had been dissolved, 0.3 g of CS were added and the stirring was continued until all of the CS was dissolved.

400 g of this solution and 50 g of Freon 12 were introduced into an aerosol container having a volume of 600 cc. and a flow rate of 85 g/sec at ambient temperature through a nozzle having a diameter of 6 mm.

When said composition was ejected, a volume of 8L of foam was obtained which was stable for 5 minutes.

The jet of foam reached a distance of 3.5 meters to its target.

EXAMPLE 24

In the same manner as described in Example 23, a solution and a container were prepared in which the Texapon Z was replaced by the same amount of Excelsior soap flakes. The same results were obtained.

EXAMPLE 25

14.7 g of Polysperse 13 were dissolved at 105°F with stirring in 85 g of water.

After all the Polysperse 13 had been dissolved, 0.3 g of CS was added and the stirring was continued until all of the CS was dissolved.

400 g of this solution and 50 g of Freon 12 were introduced into an aerosol container having a volume of 600 cc and a flow rate of 60 g/sec at ambient temperature through a nozzle having a diameter of 5 mm.

When said composition was ejected a volume of 8L of foam was obtained which was stable for 5 minutes.

The jet of foam reached a distance of 4 meters to its target.

EXAMPLE 26

In the same manner as described in Example 26, a solution and a container were prepared in which the Polysperse 13 was replaced by the same amount of Carbanone A. The same results were obtained.

EXAMPLE 27

0.3 g of CS were mixed in 5 g of Ethox 266 and 4.7 g of Tergitol 15-5-12.

The solution was heated at 105°F until all the CS was dissolved.

Thereafter 90 g of water were added to the solution which was then stirred for a further 15 minutes at the same temperature.

70 g of this solution and 25 g of Freon 12 were introduced into an aerosol container having a volume of 100 cc and a flow rate of 14 g/sec at ambient temperature through a nozzle having a diameter of 2 mm.

When said composition was ejected, a volume of 2L of foam was obtained which was stable for 5 minutes.

The jet of foam reached a distance of 2 meters to its target.

What is claimed is:

1. A process for conveying a lacrymator at least 4 feet in the form of a foam onto a surface which process comprises dissolving a lacrymator selected from the group consisting of o-chlorobenzal-malenonitrile and phenylacylchloride in a non-toxic, compatible surface active agent selected from the group consisting of an ethoxylated nonyl phenol, ethoxylated linear alcohol, sodium lauryl sulfate and ethoxylated alkylolamide or in a solution of said surface active agent in a small amount of water to form a non-foamable solution; mixing with said non-foamable solution a solvent for said non-foamable solution selected from the group consisting of water and a solution of a water-miscible organic solvent in water until a homogeneous mixture is obtained; introducing the foamable solution into an aerosol container along with a sufficient amount of a liquified gaseous propellant to enable the foamable solution to be ejected from said container when pressurized to a distance of at least 4 feet; and ejecting said foamable composition through a distance of at least 4 feet onto said surface in the form of a foam through an orifice of said container having a cross-sectional area of from 1 mm$^2$ to 80 mm$^2$ at a flow rate of 14-240 g/second while maintaining said composition at a temperature of from 0° to 120°F., the amount by weight of surface active agent being within the range of 4.5 to 29.7% based on weight of entire foamable composition minus propellant and the amount by weight of said lacrymator being from 0.05 to 3% based on the weight of the entire foamable composition minus propellant.

2. The process of claim 1 wherein the foam volume expansion ratio of said composition is at least 4 parts, by weight, of foam to 1 part, by weight, of said foamable solution.

3. The process of claim 1 wherein said propellant is a fluorocarbon.

4. The process of claim 1 wherein an antifreeze agent is added to said foamable composition so that said composition is capable of being stored and formed at a temperature below 32°F., without freezing.

5. The process of claim 1 wherein the organic water-miscible solvent is ethanol.

* * * * *